(12) United States Patent
McDaniel

(10) Patent No.: US 7,464,984 B1
(45) Date of Patent: Dec. 16, 2008

(54) AUTOMOBILE REPLACEMENT GRILL

(76) Inventor: Sean A. McDaniel, 9707 Glen View Dr., Clinton, MD (US) 20735

( * ) Notice: Subject to any disclaimer, the term of this patent is extended or adjusted under 35 U.S.C. 154(b) by 445 days.

(21) Appl. No.: 11/438,141

(22) Filed: May 22, 2006

(51) Int. Cl.
*B60R 19/52* (2006.01)
(52) U.S. Cl. .................... 296/193.1; 293/115; 180/68.6
(58) Field of Classification Search ............. 296/193.1; 293/115; 180/68.6
See application file for complete search history.

(56) References Cited

U.S. PATENT DOCUMENTS

| D291,294 S | 8/1987 | Soma |
| D293,230 S | 12/1987 | Kawsoka |
| 5,141,282 A * | 8/1992 | Fujiwara ................. 296/193.1 |
| 2004/0124670 A1 | 7/2004 | Tate |

\* cited by examiner

*Primary Examiner*—Joseph D Pape
(74) *Attorney, Agent, or Firm*—Crossley Patent Law; Mark A. Crossley

(57) ABSTRACT

The replacement grill fits the grill opening of an automobile, the grill having a surround, a mount shelf extended from the surround, and clips for joining the mount shelf to the auto. The grill is further comprised of a multi-layer, substantially porous insert with an outer layer of expanded material, preferably having diamond shaped openings. A center mesh divides the outer layer from a partial, non-porous reflective inner layer, the inner layer having a defined shape.

19 Claims, 3 Drawing Sheets

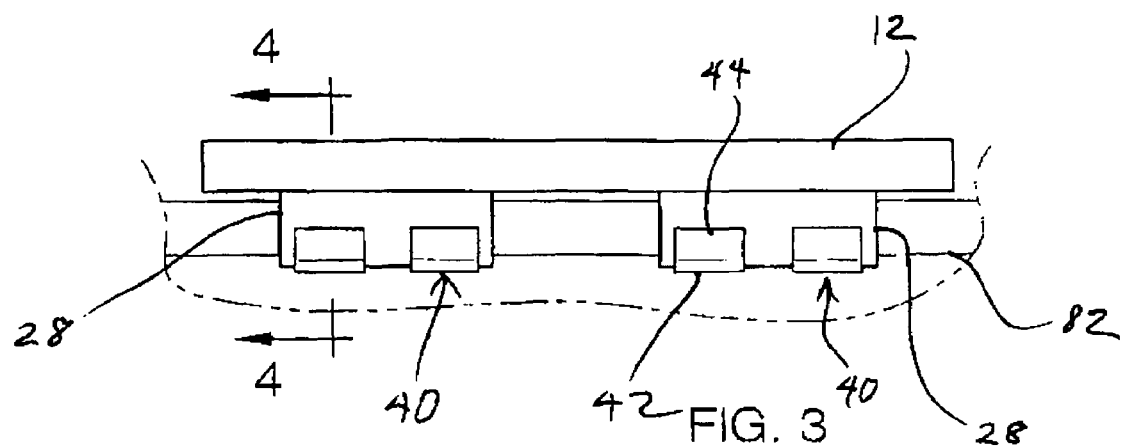
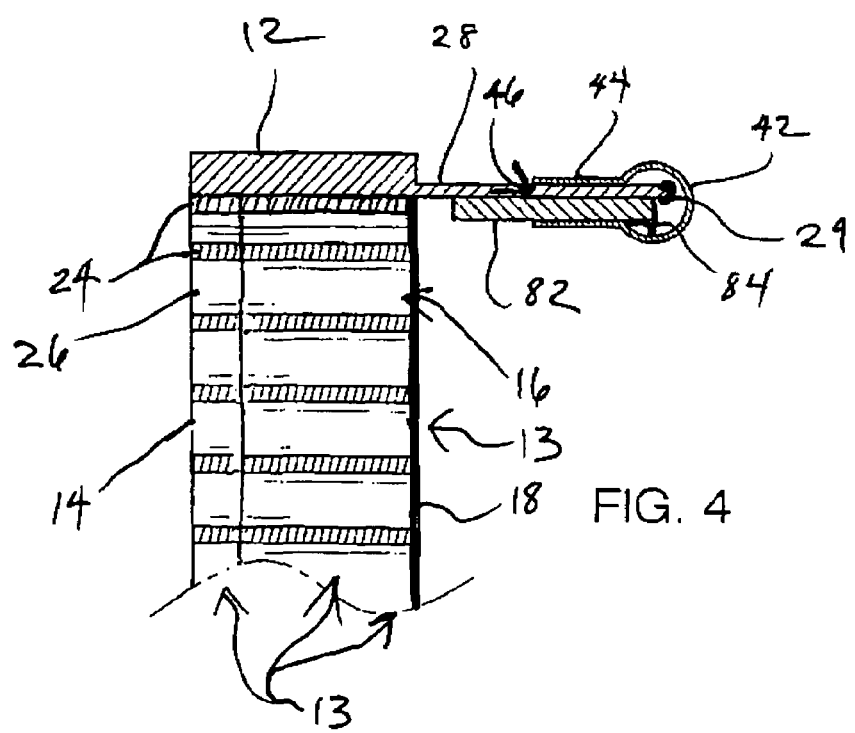

AUTOMOBILE REPLACEMENT GRILL

BACKGROUND OF THE INVENTION

Virtually all automobiles have a grill. Grills are for both function and design. A primary function of a grill is to protect the radiator of a car, or the engine bay, while allowing the passage of cooling air. The design of a grill has long been a subject of automobile designers and customizers. Many owners and auto users prefer a grill that is unlike that of the factory provided grill, for both improved function and for aesthetic appeal.

FIELD OF THE INVENTION

The automobile replacement grill relates to auto grills and more specifically to a grill which provides a custom design and potentially improved function.

DESCRIPTION OF THE PRIOR ART

Prior related art teaches various automobile components, none of which are comparable to the present replacement grill. U.S. Pat. No. 2004/0124670A1 issued to Tate on Jul. 1, 2004 teaches a grill for a land vehicle and also a land vehicle having a grill. The device focuses on impact absorption. The device is not offered as an inexpensive aftermarket aesthetic improvement as is the present replacement grill. U.S. Design Pat. No. 291,294 issued to Soma on Aug. 11, 1987 teaches an automobile radiator grill having a specific appearance. The appearance of the radiator grill is unlike that of the present replacement grill. The radiator grill does not offer the multi-layer construction and radiator protection of the present replacement grill. U.S. Design Pat. No. 293,230 issued to Kawsoka on Dec. 15, 1987 teaches an automobile radiator grill having a specific appearance. The ornamental design of the radiator grill is unlike that of the present replacement grill. The radiator grill does not teach the multilayer construction of the present replacement grill. The radiator grill does not teach the fastening mechanisms of the present replacement grill.

While the above-described devices fulfill their respective and particular objects and requirements, they do not describe an automobile grill that provides for the advantages of the present automobile replacement grill. In this respect, the automobile replacement grill substantially departs from the conventional concepts and designs of the prior art. Therefore, a need exists for an improved automobile replacement grill.

SUMMARY OF THE INVENTION

The general purpose of the automobile replacement grill, described subsequently in greater detail, is to provide an automobile replacement grill which has many novel features that result in an improved automobile replacement grill which is not anticipated, rendered obvious, suggested, or even implied by prior art, either alone or in combination thereof.

To attain this, the replacement grill fits the grill opening of an automobile. The grill has a surround which forms the entire outer perimeter of the grill. The mount shelf extends from the surround. The mount shelf is preferably integral to the surround. A plurality of clips joins the mount shelf to the auto. The mount shelf is further comprised of a shelf bulge whereby the clips are more easily retained when applied. The clips are comprised of a semicircle on one end and spaced apart legs extended therefrom. The legs terminate in an opening opposite the semicircle end of the clip. The spring clip semicircle encircles the shelf bulge and also provides for encircling a panel lip on autos. Many automobiles have a panel proximal to the radiator for fastening the shelf to. Such panels are often comprised of a lip or edge. The clips provide for fastening around such a lip or edge. The shelf and clips provide for ease of attachment of the replacement grill. The grill is further comprised of a multi-layer, substantially porous insert. The insert is comprised of an outer layer, a center mesh, and an inner layer. The outer layer is of expanded material, such as metal, plastic, abs, FRP (fiberglass reinforced plastic), or the like. More than one shape opening is offered within the expanded material outer layer of the replacement grill.

Squares, circles, rectangles, and the like are grill openings provided in the outer layer in varied embodiments of the replacement grill. The preferred shape of the openings is diamonds.

A center mesh divides the outer layer from the inner layer. The center mesh is preferably multi-layered. The center mesh and outer layer provide for the passage of cooling air for the engine bay of the auto. The fine mesh also blocks small bugs and debris from the radiator. The outer layer blocks larger objects from entering the mesh or invading the radiator. The reflective inner layer covers only a portion of the insert. The inner layer is offered in a plurality of defined shapes. The preferred shape of the inner layer is a T.

The replacement grill offers a decorative and functional alternative feature for an auto whereby a user can customize the appearance of the auto and provide radiator protection.

Thus has been broadly outlined the more important features of the improved automobile replacement grill so that the detailed description thereof that follows may be better understood and in order that the present contribution to the art may be better appreciated.

An object of the automobile replacement grill is to replace a previously fitted grill.

An added object of the automobile replacement grill is to provide easy attachment and removal.

A further object of the automobile replacement grill is to offer a distinctive appearance.

An additional object of the automobile replacement grill is to protect the radiator of the auto.

These together with additional objects, features and advantages of the improved automobile replacement grill will be readily apparent to those of ordinary skill in the art upon reading the following detailed description of presently preferred, but nonetheless illustrative, embodiments of the improved automobile replacement grill when taken in conjunction with the accompanying drawings.

In this respect, before explaining the current embodiments of the improved automobile replacement grill in detail, it is to be understood that the automobile replacement grill is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved automobile replacement grill. It is therefore important that the claims be regarded as including such equivalent constructions insofar as they do not depart from the spirit and scope of the automobile replacement grill. It is also to be understood that the phraseology and terminology employed herein are for purposes of description and should not be regarded as limiting.

BRIEF DESCRIPTION OF THE DRAWINGS

FIG. 3 is a top plan view.

FIG. 4 is a cross sectional view of FIG. 3, taken along the line 4-4.

DETAILED DESCRIPTION OF THE DRAWINGS

With reference now to the drawings, and in particular FIGS. 1 through 5 thereof, the principles and concepts of the automobile replacement grill generally designated by the reference number 10 will be described.

Figure 1:
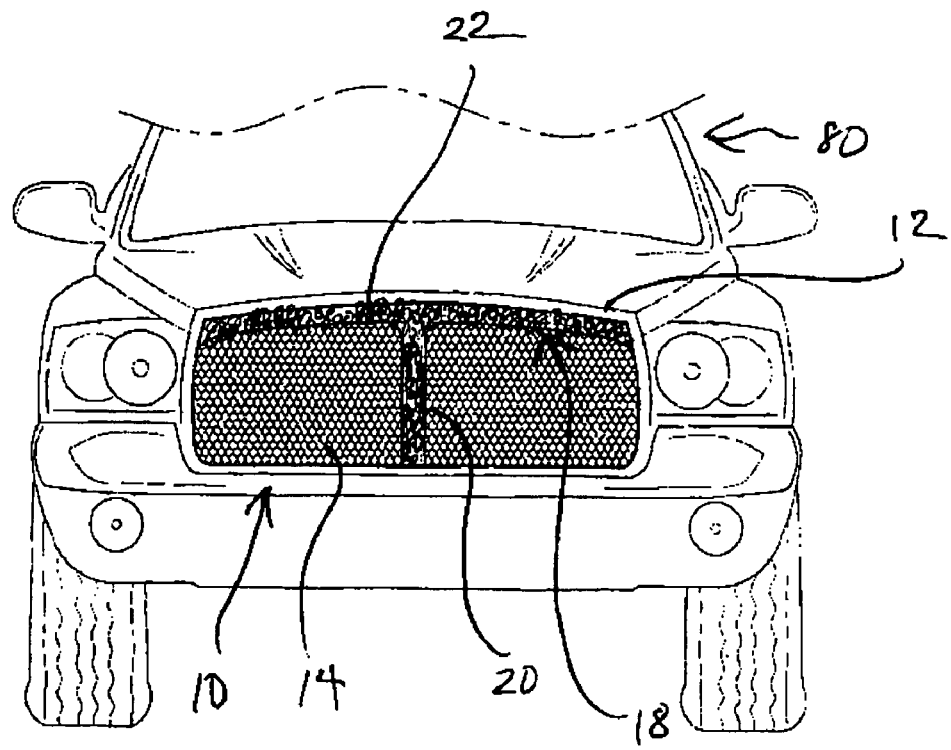
FIG. 1 is a front elevation view of the grill installed in an auto.
Figure 2:
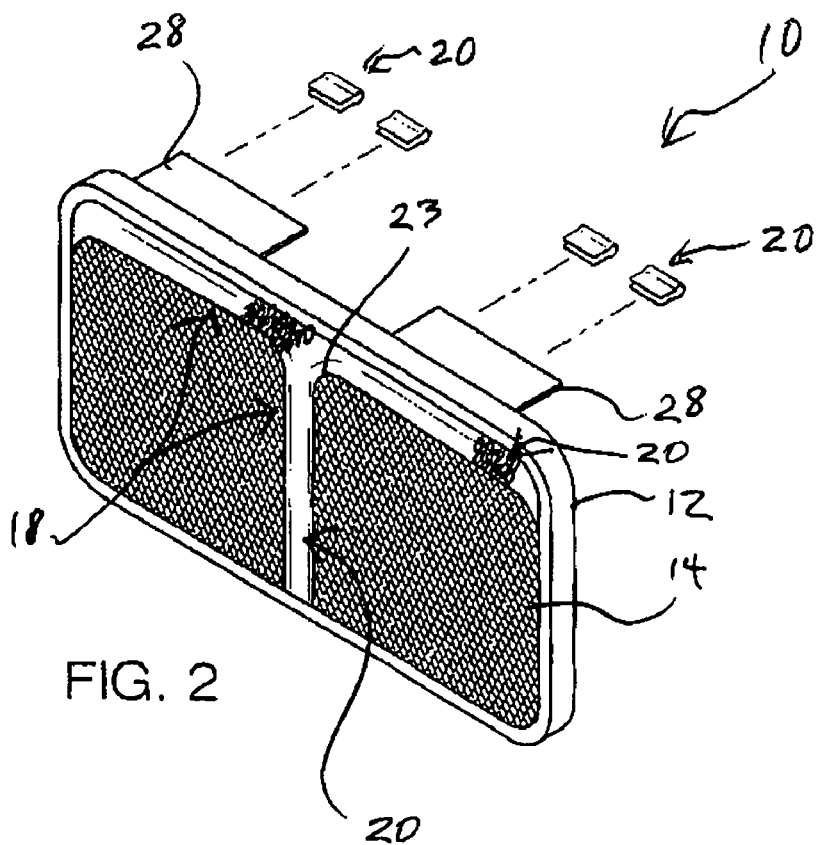
FIG. 2 is a perspective view of the grill.

Referring to FIG. 1, the replacement grill 10 is fitted to the grill opening of an automobile 80. The surround 12 comprises the entire outer perimeter of the grill 10. The outer layer 14 is comprised of an expanded material with openings 26. The reflective inner layer 18 comprises only a portion of the multi-layer insert 13. The reflective inner layer 18, in the illustrated embodiment, is non-porous. A non-porous reflective layer 18 is preferred, but the grill 10 is not limited to such. The reflective inner layer 18 comprises a defined T shape. The T shape is comprised of an upper transverse 22 disposed proximal to the top of the grill 10. The transverse 22 is blended into he inner layer vertical 20 by the smooth bend 23.

The vertical 20 is centrally disposed in the grill 10. The reflective inner layer 18 is disposed on the inside of the grill 10 with the center mesh 16 and the outer layer 14 disposed outwardly therefrom. The reflective layer 18 is thereby visible from the outside of the grill 10 as a defined shape.

Referring to FIGS. 3 and 4, the automobile replacement 10 grill has an inside and an outside. The grill 10 comprises a rigid grill surround 12 comprising an entire outer perimeter of the grill 10.

The mount shelf 28 is integrally extended from an upper portion of the surround 12. The mount shelf 28 extends therefrom toward the engine bay of the auto 82. The shelf bulge 29 is disposed on an outer edge of the mount shelf 28. The shelf bulge provides for spring clip 40 retention on the shelf 28 and the auto panel 82. The auto panel 82 comprises a typical panel lip 84. Each clip 40 is comprised of two opposite spaced apart ends. A semicircle 42 comprises one end of the clip 40. Two spaced apart legs 44 extend from the semicircle 42. An opening 46 is between the legs 44. The opening 46 comprises the end of the clip 40 opposite the semicircle 42. The substantially porous multi-layer insert 13 is disposed within the grill surround 12. The multi-layer insert 13 is comprised of an expanded material outer layer 14. A plurality of openings 46 are in the expanded material outer layer 14. Each opening 46 is of a substantially diamond shape. The center mesh 16 is disposed between the outer layer 14 and the inner layer 18. The center mesh 16 is porous. The partial, reflective non-porous inner layer 18 is disposed on the inside of the grill 10 insert 13. The inner layer 18 forms a defined shape.

This preferred embodiment of the grill 10 has an inner layer 18 which forms a T shape. The T shape is comprised of an upper transverse 22 proximal to the top of the surround 12. The vertical 20 of the reflective inner layer 18 is joined to a center of the T shape. The smooth bend 23 joins the vertical 20 to the transverse 22.

Figure 5:
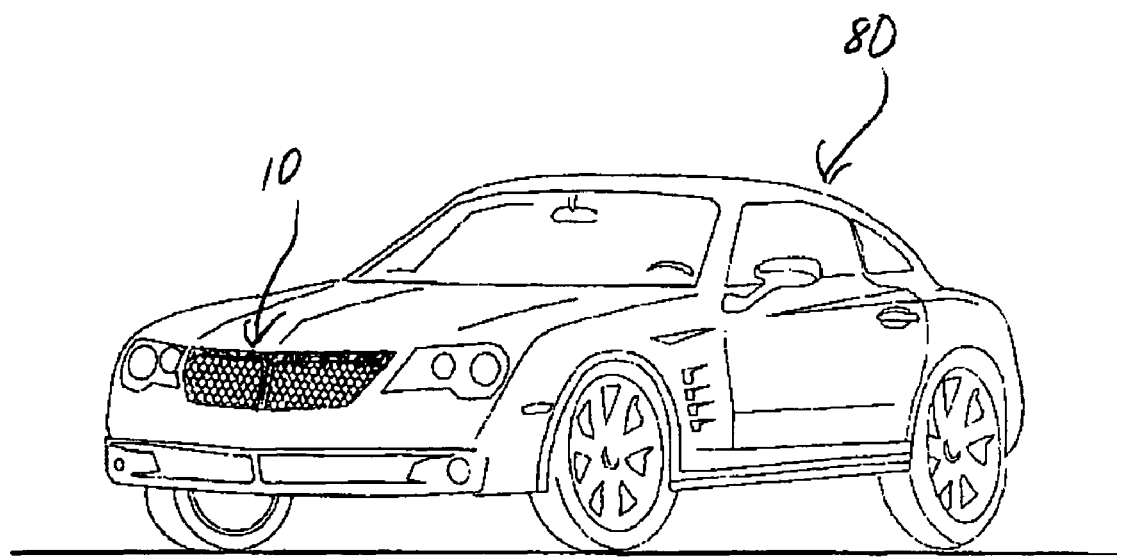
FIG. 5 is a perspective view of an automobile with the replacement grill installed.

The perspective view of FIG. 5 illustrates the grill 10 installed in the automobile 80.

With respect to the above description then, it is to be realized that the optimum dimensional relationships for the parts of the automobile replacement grill, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the automobile replacement grill.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the automobile replacement grill may be used.

Therefore, the foregoing is considered as illustrative only of the principles of the automobile replacement grill. Further, since numerous modifications and changes will readily occur those skilled in the art, it is not desired to limit the automobile replacement grill to the exact construction and operation shown and described, and accordingly, all suitable modifications and equivalents may be resorted to, falling within the scope of the automobile replacement grill.

What is claimed is:

1. An automobile replacement grill for fit within a grill opening, the grill having an inside and an outside, the grill comprising:
   a rigid grill surround comprising an entire outer perimeter of the grill;
   a mount shelf attached to an inside top of the surround;
   a plurality of clips, the clips for removably attaching the shelf to the automobile;
   a porous multi-layer insert within the grill surround, the insert having an inside and an outside;
   an outwardly reflective layer on a part of the inside of the insert.

2. The grill in claim 1 wherein the mount shelf is further comprised of a shelf bulge on an outer edge of the mount shelf.

3. The grill in claim 1 wherein the mount shelf is an integral part of the grill surround.

4. The grill in claim 2 wherein the mount self is an integral part of the grill surround.

5. The grill in claim 1 wherein the outside of the multi-layer insert comprises diamond shaped openings.

6. The grill in claim 2 wherein the outside of the multi-layer insert comprises diamond shaped openings.

7. The grill in claim 3 wherein the outside of the multi-layer insert comprises diamond shaped openings.

8. The grill in claim 4 wherein the outside of the multi-layer insert comprises diamond shaped openings.

9. An automobile replacement grill for fit within a grill opening, the grill having an inside and an outside, the grill comprising:
   a rigid grill surround comprising an entire outer perimeter of the grill;
   a mount shelf attached to an upper inside portion of the surround;
   a shelf bulge on an outer edge of the mount shelf;
   a plurality of clips, the clips for removably attaching the shelf to the automobile;
   a porous multi-layer insert within the grill surround, the multi-layer insert comprised of:
      an expanded material outer layer;

a plurality of openings in the expanded material;
a center mesh;
a reflective partial inner layer.

10. The grill in claim 9 wherein the mount shelf is further comprised of a shelf bulge on an outer edge of the mount shelf.

11. The grill in claim 9 wherein the mount shelf is an integral part of the grill surround.

12. The grill in claim 10 wherein the mount shelf is an integral part of the grill surround.

13. The grill in claim 9 wherein the outside of the multi-layer insert comprises diamond shaped openings.

14. The grill in claim 10 wherein the outside of the multi-layer insert comprises diamond shaped openings.

15. The grill in claim 11 wherein the outside of the multi-layer insert comprises diamond shaped openings.

16. The grill in claim 12 wherein the outside of the multi-layer insert comprises diamond shaped openings.

17. An automobile replacement grill for fit within a grill opening, the grill having an inside and an outside, the grill comprising:
   a rigid grill surround comprising an entire outer perimeter of the grill;
   a mount shelf attached to an upper portion of the surround;
   a shelf bulge on an outer edge of the mount shelf;
   a plurality of clips, each clip comprised of:
      two opposite spaced apart ends;
      a semicircle comprising one end;
      two spaced apart legs extended from the semicircle;
      an opening between the legs, the opening comprising the end of the clip opposite the semicircle;
   a substantially porous multi-layer insert within the grill surround, the multi-layer insert comprised of:
      an expanded material outer layer;
      a plurality of openings in the expanded material, each opening of a substantially diamond shape;
      a center mesh;
      a partial reflective non-porous inner layer, the inner layer forming a shape.

18. The grill in claim 17 wherein the inner layer comprises a T shape.

19. The grill in claim 18 wherein the T shape is comprised of:
   an upper transverse;
   a vertical extended from a center of the T shape;
   a smooth bend joining the vertical to the transverse.

* * * * *